United States Patent
Han et al.

(10) Patent No.: US 9,026,081 B2
(45) Date of Patent: May 5, 2015

(54) METHOD AND APPARATUS FOR NEGOTIATION AND NOTIFICATION OF A NETWORK ACCESS TIME PERIOD IN A WIRELESS COMMUNICATION SYSTEM

(75) Inventors: Guang Han, Arlington Heights, IL (US); Bonnie Chen, DeSoto, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 303 days.

(21) Appl. No.: 12/817,350

(22) Filed: Jun. 17, 2010

(65) Prior Publication Data
US 2010/0330962 A1 Dec. 30, 2010

Related U.S. Application Data

(60) Provisional application No. 61/221,777, filed on Jun. 30, 2009.

(51) Int. Cl.
| | |
|---|---|
| H04M 1/66 | (2006.01) |
| H04M 1/68 | (2006.01) |
| H04M 3/16 | (2006.01) |
| H04W 48/02 | (2009.01) |
| H04L 29/08 | (2006.01) |
| H04L 29/06 | (2006.01) |

(52) U.S. Cl.
CPC ............ *H04W 48/02* (2013.01); *H04L 67/04* (2013.01); *H04L 69/28* (2013.01)

(58) Field of Classification Search
USPC ........ 455/418–422.1, 432.1–455, 464, 550.1, 455/552.1, 553.1; 370/310.2, 328–331, 370/338, 341, 352–356
See application file for complete search history.

(56) References Cited

U.S. PATENT DOCUMENTS

| | | | |
|---|---|---|---|
| 6,700,961 | B1 | 3/2004 | Dacloush et al. |
| 7,215,942 | B1 | 5/2007 | McQuaide, Jr. et al. |
| 7,239,862 | B1 | 7/2007 | Clare et al. |
| 7,356,304 | B2 | 4/2008 | Zoeckler |
| 7,367,044 | B2 * | 4/2008 | Fowler et al. ...................... 726/1 |
| 8,175,040 | B2 * | 5/2012 | Demirhan et al. ............ 370/329 |
| 2006/0190991 | A1 * | 8/2006 | Iyer .................................. 726/3 |
| 2007/0043676 | A1 | 2/2007 | Gao et al. |
| 2009/0047951 | A1 * | 2/2009 | Yeoum et al. ............... 455/435.1 |

(Continued)

OTHER PUBLICATIONS

S. Donovan, et al., "Session Timers in the Session Initiation Protocol (SIP)," Network Working Group, The Internet Society, Apr. 2005, 26 pages.

(Continued)

*Primary Examiner* — San Htun
(74) *Attorney, Agent, or Firm* — Lerner, David, Littenberg, Krumholz & Mentlik, LLP

(57) ABSTRACT

In a wireless communication system wherein a user equipment (UE) that accesses a cell served by an access point (sometimes known as femtocell) is granted only a limited time period during which to camp on, attach to, or connect to the cell, the communication system permits a user of the UE to anticipate an expiration of the time period and, if desired negotiate an extension of the time period. More particularly, the communication system provides for notification of the UE of the duration of this limited time period and further permits the UE to negotiate an extension of the time period when the UE desires to do so. In the event an extension is requested by the user and granted by the owner/operator, a notification will be sent to the user and the UE may reset a timer.

9 Claims, 5 Drawing Sheets

(56) References Cited

U.S. PATENT DOCUMENTS

2009/0093232 A1* 4/2009 Gupta et al. .................. 455/410
2009/0288139 A1* 11/2009 Huber et al. ...................... 726/2
2010/0197307 A1* 8/2010 Horn et al. ................. 455/435.1

OTHER PUBLICATIONS

3rd Generation Partnership Project, "3GPP TS 22.220 V2.0.0—Technical Specification Group Services and Systems Aspects; Service Requirements for Home NodeBs and Home eNodeBsm (Release 9)," 3GPP Organizational Partners, Mar. 2003, 22 pages.

* cited by examiner

METHOD AND APPARATUS FOR NEGOTIATION AND NOTIFICATION OF A NETWORK ACCESS TIME PERIOD IN A WIRELESS COMMUNICATION SYSTEM

CROSS-REFERENCE TO RELATED APPLICATION

This application claims priority from provisional application Ser. No. 61/221,777, entitled "METHOD AND APPARATUS FOR NEGOTIATION AND NOTIFICATION OF A NETWORK ACCESS TIME PERIOD IN A WIRELESS COMMUNICATION SYSTEM," filed Jun. 30, 2009, which is commonly owned and incorporated herein by reference in its entirety.

FIELD OF THE INVENTION

The present invention relates generally to wireless communication systems, and more specifically to negotiation and notification of a network access time period in a wireless communication system.

BACKGROUND OF THE INVENTION

The 3GPP LTE (Third Generation Partnership Project Long Term Evolution) communication standard is currently in the process of development for the purpose of bringing new network architecture and new applications and services to users along with improved spectral efficiency and higher data speeds. As part of the evolution of the 3GPP LTE systems, proposals have been made for "femtocells," that is, smaller coverage areas and/or associated short-range base stations that may be deployed in a home or in certain public places to provide cellular coverage in such smaller areas or to provide individual use by, and charging to, users when they are accessing such cells. Such small coverage area cells may be referred to as a femtocell or a Closed Subscriber, or User, Group (a CSG or CUG) cell and may be provided wireless service by a wireless transceiver such as a Home Node B (HNB) or a Home eNode B (HeNB).

Under the 3GPP LTE standards, it is possible to limit a time period that a user's equipment (UE) is allowed to camp on such a cell, that is, to limit a user's granted access rights. This time period can be configurable by an owner/operator of a HNB/HeNB or a network operator operating the cell and can range from a fraction of an hour, for example, tenths of an hour, to several days. If no value is configured into the HNB/HeNB, then the standards provide for a user to have unlimited access to the cell.

When the time period for which a UE is granted access rights expires, the UE is released from connected mode and is no longer able to obtain services from the cell, except for emergency calls. However, as the standards currently exist, the user of the UE does not know the duration of the access period and, further, is not able to negotiate an extension of the access period.

Therefore, a need exists for a method and apparatus for notifying a user of a duration of a grant of access to a CSG cell and to permit the user to negotiate an extension of the access grant.

Figure 1:
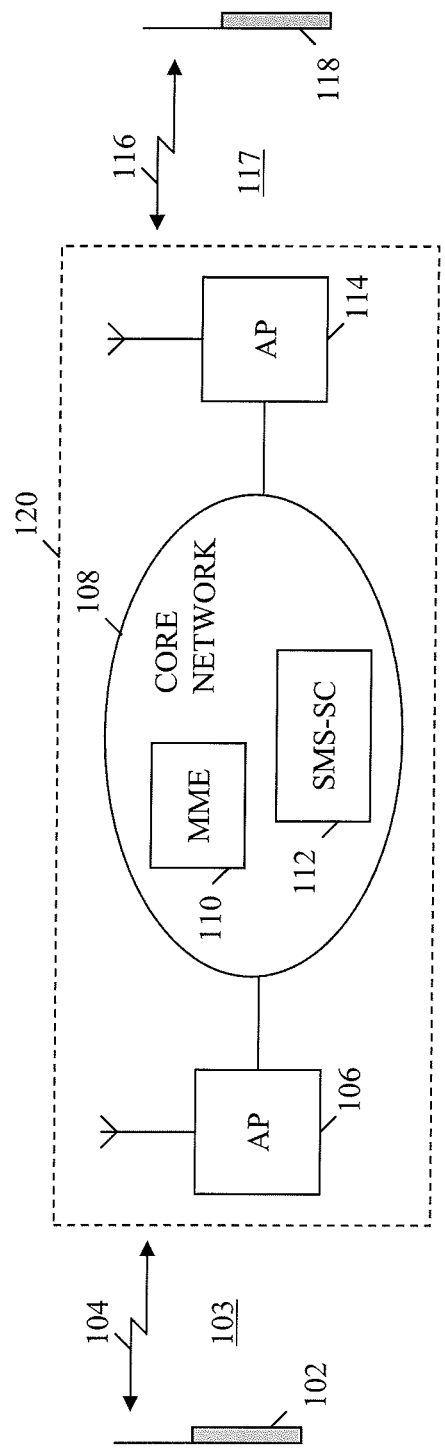
FIG. 1 is a block diagram of a wireless communication system in accordance with various embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need that exists for a method and apparatus for notifying a user of a duration of a grant of access to a CSG cell and to permit the user to negotiate an extension of the access grant, a wireless communication system is provided wherein a user equipment (UE) that accesses a cell served by an access point (AP) (sometimes known as femtocell) is granted only a limited time period during which to camp on, attach to, or connect to the cell, the communication system permits a user of the UE to anticipate an expiration of the time period and, if desired negotiate an extension of the time period. More particularly, the communication system provides for notification of the UE of the duration of this limited time period and further permits the UE to negotiate an extension of the time period when the UE desires to do so. In the event an extension is requested by the user and granted by the owner/operator, a notification will be sent to the user and the UE may reset a timer.

Generally, an embodiment of the present invention encompasses a method for granting an access time period during which a UE may camp on a wireless network. The method includes receiving a request for a grant of an access time period from the UE, in response to receiving the request, determining, by reference to a group policy, an access time period during which the UE may camp on a cell associated with an AP, and conveying a grant of the access time period to the UE.

Another embodiment of the present invention encompasses a method for extending a period of time during which a UE may camp on a wireless network. The method includes, when the UE is camping on a cell associated with an AP, receiving, from the UE, a request for a grant of an additional period of time during which the UE may camp on the cell, in response to receiving the request, determining, by reference to one or more of a group policy and an owner/operator of the AP serving the UE, an additional access time period during which the UE may camp on the cell, and conveying, to the UE, a grant of an additional time period during which the UE may camp on the cell based on the determined access time period.

Yet another embodiment of the present invention encompasses an apparatus capable of granting an access time period during which a UE may camp on a wireless network. The apparatus includes an at least one memory device that maintains a group policy associated with an AP and a processor that is configured to receive a request for a grant of an access time period from the UE when served by the AP, in response to receiving the request, determine, by reference to the group policy, an access time period during which the UE may camp on a cell associated with the AP, and convey a grant of the access time period to the UE.

Yet another embodiment of the present invention encompasses an apparatus capable of granting an access time period during which a UE may camp on a wireless network. The apparatus includes an at least one memory device that maintains a group policy associated with an AP and a processor that is configured to receive, when the UE is camping on a cell associated with the AP, receive, from the UE, a request for a grant of an additional period of time during which the UE may camp on the cell, in response to receiving the request, determine, by reference to one or more of the group policy and an owner/operator of the AP, an additional access time period during which the UE may camp on the cell, and convey, to the UE, a grant of an additional time period during which the UE may camp on the cell based on the determined access time period.

Turning now to the drawings, the present invention may be more fully described with reference to FIGS. 1-7. FIG. 1 is a block diagram of a wireless communication system 100 in accordance with various embodiments of the present invention. Communication system 100 includes multiple access points (APs) 106, 114, such as an a Home Node B (HNB), a Home eNode B (HeNB), or a femtocell, that provides wireless communications services to users' equipment (UEs) residing in a coverage area of the AP, and in particular, to a Closed User, or Subscriber, Group (CUG or CSG) cell. CSG and CUG are used herein interchangeably. Each AP 106, 114 includes a base station that provides wireless services to users' equipment (UEs) in a coverage area, such as a cell or a femtocell (in the coverage area sense of the term), served by the base station and further includes a gateway that provides access to a core network 108. However, in another embodiment of the present invention, the gateway may be a network element separate from the associated base station, such as one or more of a Serving Gateway (S-GW) and a Packet Data Network Gateway (PDN GW). Communication system 100 further includes the core network 108, which comprises a Mobility Management Entity (MME) 110 and a Short Message Service-Service Center (SMS-SC) 112. APs 106, 114 may communicate with each of MME 110 and SMS-SC 112 via a data network (not shown) associated with the core network.

Communication system 100 further includes multiple users' equipment (UEs) 102, 118, such as, but not limited to, a cellular telephone, a radiotelephone, or a Personal Digital Assistant (PDA), personal computer (PC), or laptop computer equipped for wireless communications. Each of APs 106, 114 provides wireless communication services to users' equipment (UEs) located in a coverage area of the AP, which coverage area herein is referred to as a 'cell,' via a respective air interface 104, 116. For example, as depicted in FIG. 1, AP 106 provides wireless communication services to coverage area 103, and to UE 102 residing therein, via air interface 104 and AP 114 provides wireless communication services to coverage area 117, and to UE 118 residing therein, via air interface 116. Each air interface 104, 116 includes a forward link that includes a pilot channel, at least one forward link traffic channel, and a forward link common and dedicated signaling channels. Each air interface 104, 116 further includes a reverse link that includes at least one reverse link traffic channel, reverse link common and dedicated signaling channels, and an access channel. Together, APs 106, 114, core network 108, MME 110, and SMS-SC 112 are included in a wireless network 120 of communication system 100, and each of APs 106, 114, MME 110, and SMS-SC 112, may be referred as a network element of communication system 100.

Figure 2:
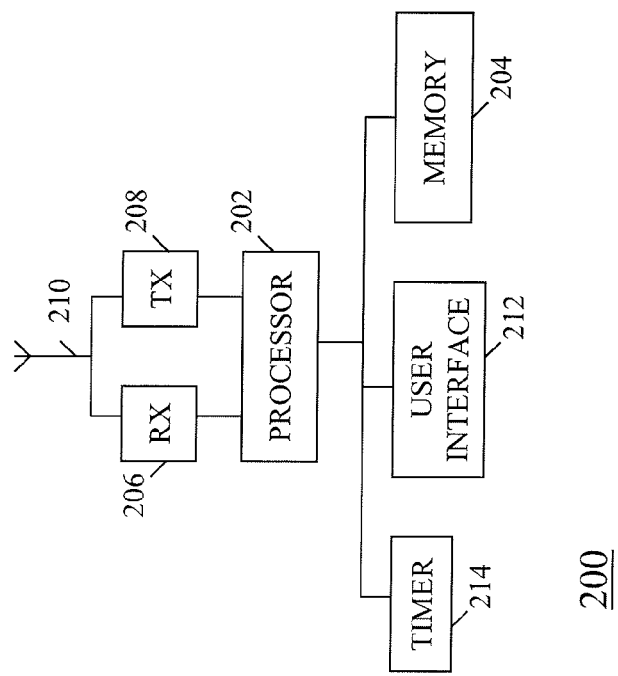
FIG. 2 is a block diagram of a user equipment of FIG. 1 in accordance with an embodiment of the present invention.

Referring now to FIG. 2, a block diagram of a user equipment (UE) 200, such as UEs 102 and 118, is provided in accordance with an embodiment of the present invention. UE 200 includes a processor 202, such as one or more microprocessors, microcontrollers, digital signal processors (DSPs), combinations thereof or such other devices known to those having ordinary skill in the art, which processor is configured to execute the functions described herein as being executed by the UE. UE 200 further includes an at least one memory device 204, such as random access memory (RAM), dynamic random access memory (DRAM), and/or read only memory (ROM) or equivalents thereof, that is coupled to the processor and that maintains data and programs that may be executed by the associated processor and that allows the UE to perform all functions necessary to operate in communication system 100.

UE 200 further includes a user interface 212 and timer 214 coupled to processor 202. User interface 212 provides a user of the UE with the capability of interacting with the UE, including inputting instructions into the UE and receiving audio, textual, and video messaging from the UE. In one embodiment of the present invention, user interface 212 may include an audio speaker, an audio receiver, a display screen, and a keypad that includes multiple keys that may be used by a user of the MS to input instructions into the MS. In another embodiment of the present invention, the display screen may comprise a touch screen. Timer 214 is used by processor 202 to count down an access time period so that the processor can determine an amount of time remaining in an access time period and can display the remaining amount of time on user interface 212. UE 200 also includes a radio frequency (RF) receiver 206 and an RF transmitter 208. RF receiver and transmitter 206, 208 are each coupled to processor 202 and an antenna 210 and function to exchange RF signals with BSs serving the UE via a corresponding air interface.

Figure 3:
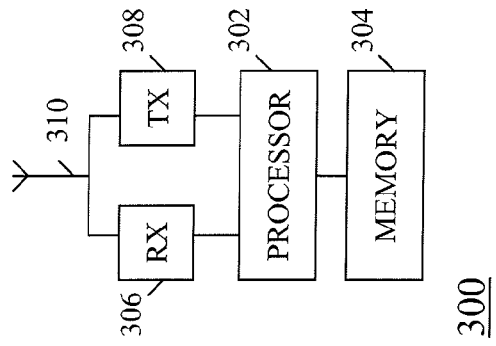
FIG. 3 is a block diagram of an access point of FIG. 1 in accordance with an embodiment of the present invention.

FIG. 3 is a block diagram of an AP 300, such as APs 106 and 114, in accordance with an embodiment of the present invention. BS 300 includes a processor 302, such as one or more microprocessors, microcontrollers, digital signal processors (DSPs), combinations thereof or such other devices known to those having ordinary skill in the art, which processor is configured to execute the functions described herein as being executed by the AP. AP 300 further includes an at least one memory device 304, such as random access memory (RAM), dynamic random access memory (DRAM), and/or read only memory (ROM) or equivalents thereof, that is coupled to the processor and that maintains data and programs that may be executed by the associated processor and that allows the BS to perform all functions necessary to operate in communication system 100. At least one memory device 304 further maintains a Closed Subscriber, or User, Group identifier (CUG ID) that identifies the AP and, thereby, UEs served by the AP. AP 300 further includes a radio frequency (RF) receiver 306 and an RF transmitter 308 that are each coupled to processor 302 and an antenna 310 and that exchange RF signals with UEs served by the AP via a corresponding air interface.

Figure 4:
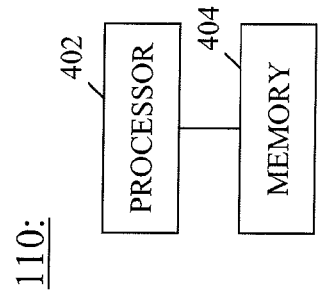
FIG. 4 is a block diagram of a Mobility Management Entity of FIG. 1 in accordance with an embodiment of the present invention.

FIG. 4 is a block diagram of MME 110 in accordance with an embodiment of the present invention. MME 110 include a processor 402, such as one or more microprocessors, microcontrollers, digital signal processors (DSPs), combinations thereof or such other devices known to those having ordinary skill in the art, which processor is configured to execute the functions described herein as being executed by the MME. MME 110 further include an at least one memory device 404 that may comprise random access memory (RAM), dynamic random access memory (DRAM), and/or read only memory (ROM) or equivalents thereof, that maintain data and programs that may be executed by the associated processor and that allow the MME to perform all functions necessary to operate in communication system 100.

At least one memory device 404 further maintains a profile for each UE, such as UEs 102, 118, served by, and registered with, the MME, which profile includes the capabilities of the UE. For example, when a UE registers with, that is, attaches to, network 120, the UE may convey its capabilities to MME 110 or the MME may retrieve the UE's capabilities from a Home Subscriber Server (HSS) (not shown), a Home Location Register (HLR) (not shown), or Visited Location Register (VLR) (not shown) that maintains such information. At least one memory device 404 also maintains a profile for each AP served by MME 110, which profile includes a Closed Subscriber, or User, Group policy (CUG policy), a CUG ID associated with that AP, and an identifier of an owner/operator, such as a UE ID, associated with the AP. Each maintained CUG policy includes a default access time period for UEs accessing the network via the associated AP. The default access time period is a time period during which a UE is allowed to camp on a CUG cell, that is, a time limit to a user's granted access rights. This time period can be configurable by an owner/operator of the AP or an operator of network 120 and can range from a fraction of an hour, for example, tenths of an hour, to several days. If no value is configured into the AP, a user may have unlimited access to the CUG cell.

The functionality described herein as being performed by UEs 102, 118, APs 106, 114, and MME 124 is implemented with or in software programs and instructions stored in the respective at least one memory device 204, 304, 404 associated with the UE, BS, and MME and executed by the processor 202, 302, 402 associated with the UE, AP, and MME. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the UE, AP, and MME. Based on the present disclosure, one skilled in the art will be readily capable of producing and implementing such software and/or hardware without undo experimentation.

Communication system 100 preferably operates pursuant to the 3GPP LTE (Third Generation Partnership Project Long Term Evolution) communication standards. To ensure compatibility, radio system parameters and registration, call set up, and call processing procedures are specified by the standards, including registration steps that are executed by an UE and an AP or other access network serving the UE and between the AP or other access network and associated infrastructure. However, those of ordinary skill in the art realize that communication system 100 also may operate in accordance with any one of a variety of wireless packet data communication system standards, such as the 3GPP2 (Third Generation Partnership Project2) communication standards, IEEE (Institute of Electrical and Electronics Engineers) 802.xx standards, for example, the 802.11, 802.15, or 802.16 or 802.20 standards, or other wideband wireless communication system standards.

In communication system 100, when a UE, such as UE 102, accesses a cell served by an AP, the UE is granted only a limited time period during which to camp on, attach to, or connect to (herein collectively referred to as 'camp on') the cell associated with the AP. When the time period expires, the UE must detach from, or release its connection to, the cell. In order to provide a more fully informed user of the UE and to permit the user to anticipate an expiration of the time period and, if desired negotiate an extension of the time period, communication system 100 provides for notification of the UE of the duration of this limited time period and further permits the UE to negotiate such an extension.

Figure 5:
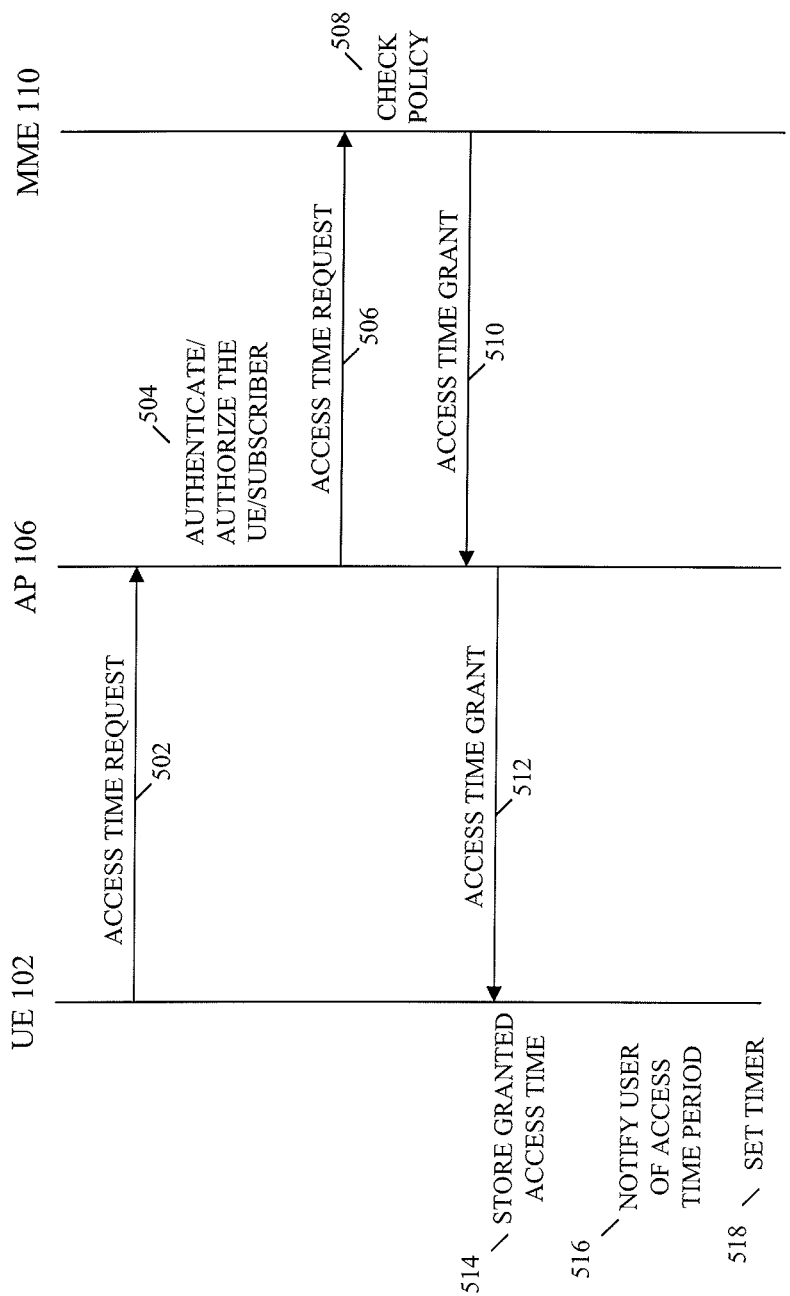
FIG. 5 is a signal flow diagram that illustrates a method executed by the communication system FIG. 1 in granting, and notifying a user equipment of, an allowed access time in accordance with various embodiments of the present invention.

Referring now to FIG. 5, a signal flow diagram 500 is provided that illustrates a method executed by communication system 100 in granting, and notifying a UE of, an allowed, limited access time during which the UE may camp on a cell associated with an AP in accordance with various embodiments of the present invention. That is, communication system 100 provides that when a UE, such as UE 102, first connects to network 120, and in particular to a serving AP, that is, AP 106, the network checks the access rights of the UE and determines the UE's allowed access time, that is, the time period during which the UE will be allowed to camp on/attach to/connect to a cell associated with the AP. Network 120 then notifies UE 102 of the UE's allowed access time and the UE, in turn, notifies a user of the UE of the allowed access time.

Signal flow diagram 500 begins when UE 102 conveys a first access time request 502 to network 120, and in particular to a serving AP, that is, AP 106, via a associated air interface, that is, air interface 104. Access time request 502 requests that the network inform the UE of an access time period, that is, a period of time that the UE is allowed to camp on a cell associated with AP 106. Access time request 502 includes an UE identifier (ID) associated with UE 102, such as a subscriber ID, a mobile ID, an IMSI (International Mobile Subscriber Identity), a phone number, or any other UE identifier known in the art.

In response to receiving access time request 502, AP 106 authenticates 504 UE 102 and authorizes the UE to access network 120 in accordance with known authentication/authorization techniques. As part of the authentication/authorization process, AP 106 determines that UE 102 is part of a group, and in particular a CUG, authorized to utilize the AP and retrieves, from an at least one memory device 304 of the AP, a group identifier, and in particular a CUG ID, associated with the AP.

In response to authenticating and authorizing UE 102, AP 106 conveys a second access time request 506 to MME 110. The second access time request includes the UE ID included in the first access time request and further includes the retrieved CUG ID. In various embodiments of the present invention, AP 106 may forward the first access time request with the CUG ID added or may convey a new access time request.

In response to receiving second access time request 506 and based on the CUG ID included the second access time request, MME 110 checks the CUG policy maintained in at least one memory device 404 for AP 106. Based on the CUG policy, MME 110 determines an access time period to grant to UE 102, that is, a time period during which the UE is allowed to camp on a cell served by AP 106. For example, the determined time period may be a default access time period maintained as part of the CUG policy. MME 110 then conveys a message comprising an access time grant 510, 512, to UE 102 via a AP 106 and air interface 104. The access time grant message 510, 512 includes the UE ID associated with UE 102 and further identifies the access time period being granted to the UE. Access time grant message 510 and/or access time grant message 512 may or may not further include the CUG ID associated with AP 106, which CUG ID may be included by MME 110 or AP 106 in the access time grant ultimately conveyed to the UE. In response receiving access time grant 512, UE 102 stores 514 a value associated with the access time period, and the CUG ID if included in the grant message, in at least one memory device 204 and notifies 516 the user of UE 102 of the granted access time period by displaying an indication of the duration of the time period on user interface 212. UE 102 further sets 518 timer 214 to count down the access time period, and signal flow diagram 500 then ends.

In one embodiment of the present invention, when UE 102 is in a deregistered state before connecting to network 102, and in particular to AP 106, the first and second access time requests 502, 506 may each comprise an Attach Request message, by which UE 102 seeks to attach to network 120. In such an embodiment, in response to receiving the Attach Request message from the UE, AP adds the CUG ID to the Attach Request message that then is sent to MME 110. In response to receiving the Attach Request message from AP 106, MME 110 determines an access time period for UE 102 by reference to the CUG policy maintained by the MME. MME 110 further establishes a context for UE 102 in the MME and establishes a default bearer between the UE and the AP, thus enabling always-on connectivity to the UE. Further, in such an embodiment of the present invention, access time grants 510 512 may each comprise an Attach Accept message that it is modified, by the present invention, to identify the granted access time period. As is known in the art, the MME also may allocate an Evolved Packet system (EPS) bearer identity for the default bearer context activated for the UE and include an EPS bearer identity Information Element in the Attach Accept message conveyed to the UE.

In another embodiment of the present invention, when UE 102 has already registered with network 120 before conveying the first access time request 502, the first and second access time requests 502, 506 may each comprise a Tracking Area Update (TAU) Request message. Again, in such an embodiment, in response to receiving the TAU Request message, AP adds the CUG ID to the TAU Request message that then is sent to MME 110. When MME 110 receives a TAU Request message that includes a CUG ID, the MME determines an access time period associated with the CUG ID by reference to the CUG policy maintained by the MME. In turn, in such an embodiment, access time grants 510 512 may each comprise a TAU Accept message that is modified, in the present invention, to identify the granted access time period.

Communication system 100 further provides for negotiating an extension of the time period during which the user is allowed to camp on a cell associated with an AP when a UE already is camped on/attached to/connected to the cell/AP. That is, communication system 100 also provides a process whereby a UE already camping on a cell may request additional access time beyond the access time already granted to the UE, for example, when the granted access time period is about to expire. In various embodiments of the present invention, communication system 100, and in particular MME 110, may determine the additional access time to be granted to the UE based on the CUG policy associated with the serving AP, and/or communication system 100 may allow an owner/operator of the serving AP to determine whether to grant additional access time and, if so, how much additional access time to grant.

Figure 6:
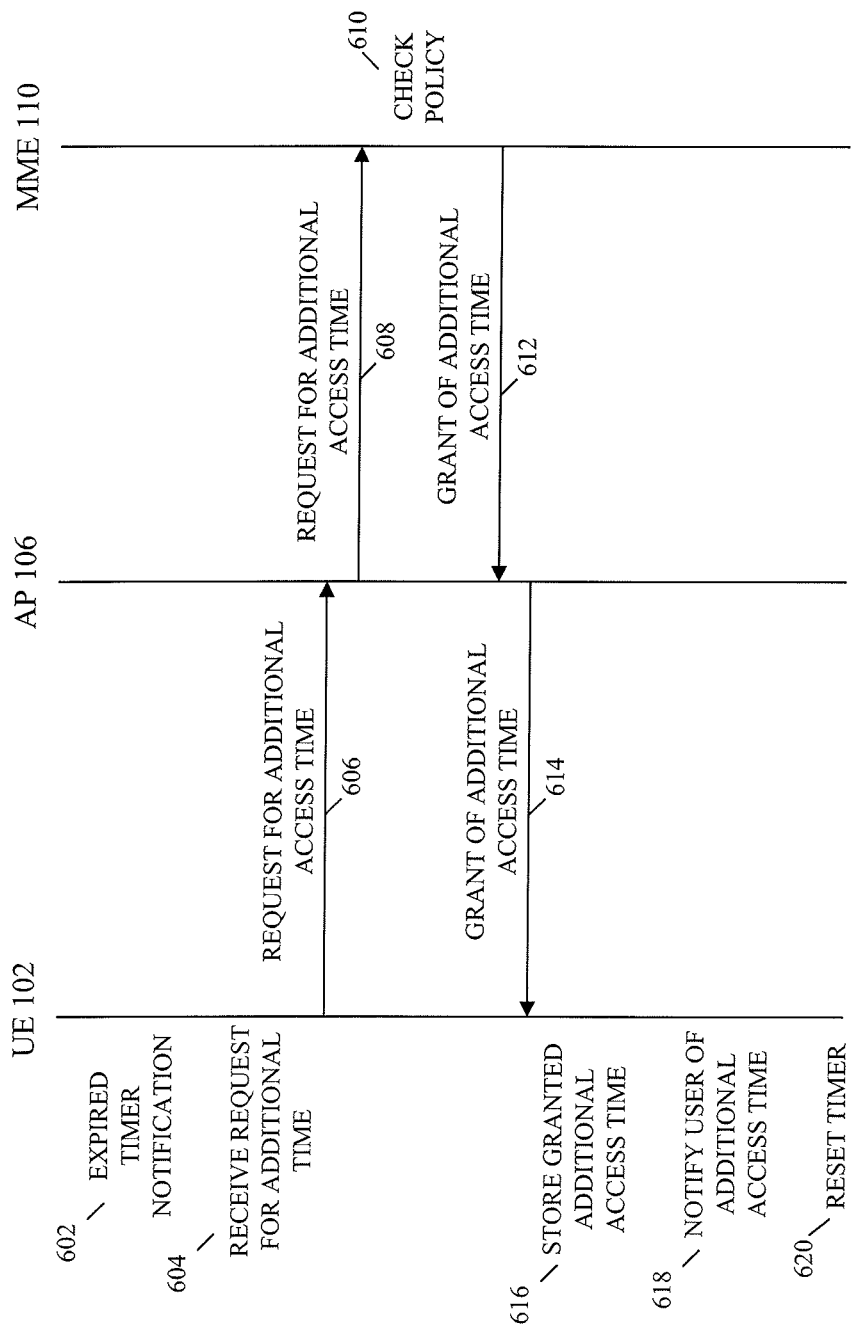
FIG. 6 is a signal flow diagram of a method executed by the communication system of FIG. 1 in extending an access time period of a user equipment in accordance with an embodiment of the present invention.

For example, and referring now to FIG. 6, a signal flow diagram 600 is provided that illustrates a method executed by communication system 100 in extending an access time period of a UE, such as UE 102, based on a CUG policy in accordance with an embodiment of the present invention. Signal flow diagram 600 begins when the UE, that is, UE 102, determines, by reference to timer 214, that an access time period is about to, or has, expired and notifies 602 a user of the UE, via user interface 212, that that the access time period is about to, or has, expired. For example, the UE may play a predetermined audio tone, or may display a textual message on a display screen of the user interface, that indicates that the access time period is about to, or has, expired.

In response to being notified that the access time period is about to, or has, expired, the user then instructs 604 the UE to request additional access time, that is, to request an additional period of time during which the UE may camp on the cell currently serving the UE. For example, the user may input an instruction to UE 102 via user interface 212 of the UE to request additional access time. For example, the user may provide an audio instruction, may input a textual instruction via a display screen of the user interface, or may depress or touch a predetermined key or softkey of the user interface associated with such an instruction.

In response to receiving 604 the instruction to request additional access time, UE 102 conveys, to a serving AP 106, a message 606 requesting additional access time. Preferably, message 606 is a TAU Request that is modified in the present invention to indicate, in a Cause data field, that the cause for sending the message is to extend an access time. The TAU Request further includes the UE ID associated with UE 102 and may be further modified to include a CUG ID associated with AP 106 when the UE has stored the CUG ID in at least one memory device 204. In response to receiving the message requesting additional access time, AP 106 forwards 608 the message to MME 110. If the message requesting additional access time does not include the CUG ID associated with AP 106, the AP further includes the CUG ID in the forwarded message requesting additional access time.

In response to receiving the additional access time request message and based on the CUG ID included the message, MME 110 checks 610 the CUG policy maintained in at least one memory device 404 for AP 106 and determines an additional access time period for grant to UE 102. For example, the additional access time period may be the default access time period maintained as part of the CUG policy, or the CUG policy may maintain a different 'additional access time period' for grant to UEs requesting additional access time. MME 110 then conveys a message 612, 614 comprising a grant of additional access time to UE 102 via AP 106 and air interface 104. The message 612, 614 granting additional access time includes the UE ID associated with UE 102 and further identifies the additional access time period being granted to the UE. Access time grant message 612 and/or access time grant message 614 may or may not further include the CUG ID associated with AP 106, which CUG ID may be included by MME 110 or by AP 106 in the additional access time grant message received by the UE. Preferably, each of messages 612 and 614 is a TAU Accept message that is modified by the present invention to include information concerning the granted additional access time.

In response to receiving additional access time grant message 614, UE 102 stores 616 a value associated with the additional access time period in at least one memory device 204 and notifies 618 the user of UE 102 of the grant of the additional access time period by displaying, on user interface 212, an indication of the additional access time period granted to the UE. UE 102 resets 620 timer 214 to count down the additional access time period, and signal flow diagram 600 then ends.

Figure 7:
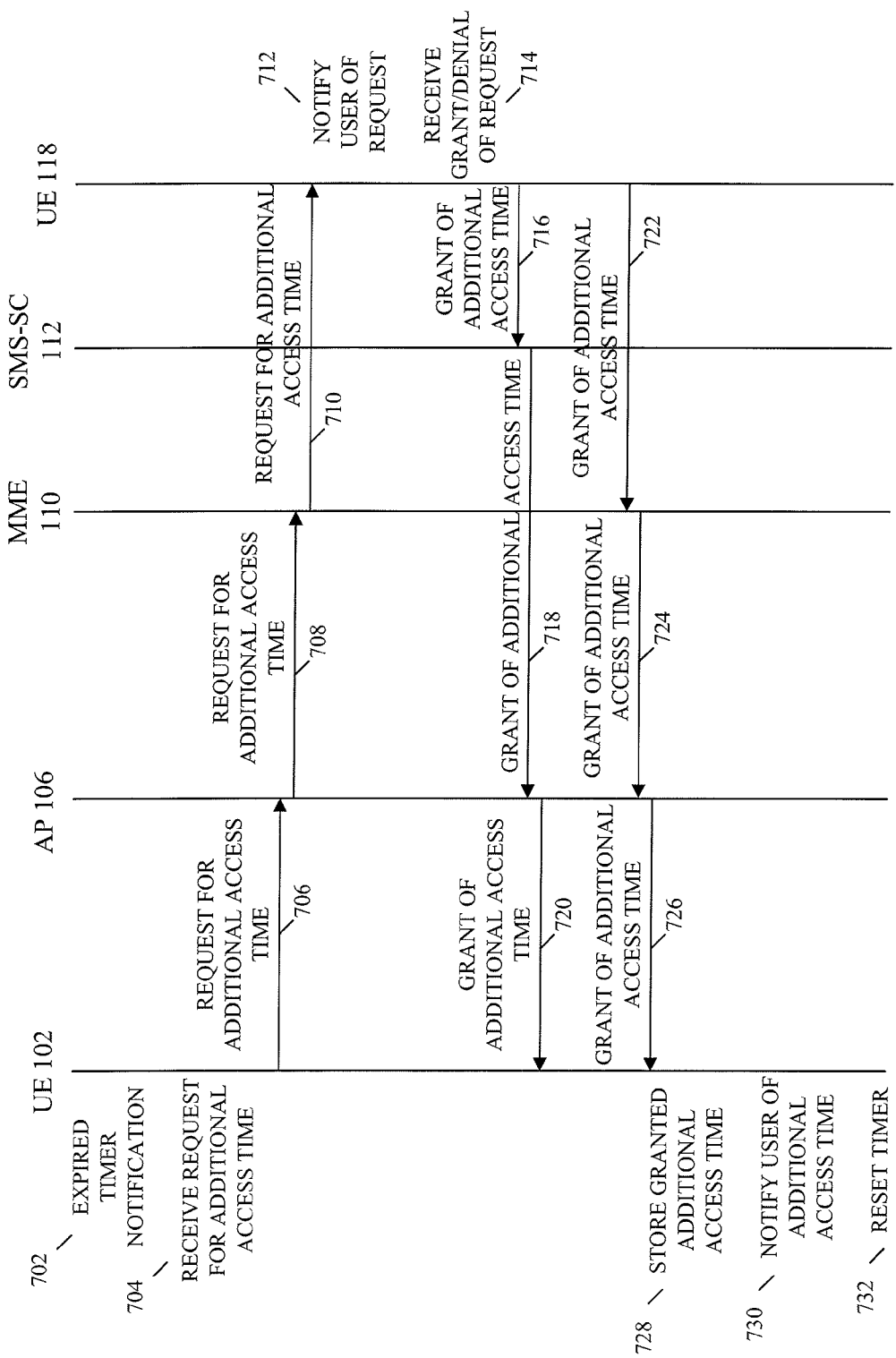
FIG. 7 is a signal flow diagram of a method executed by the communication system of FIG. 1 in extending an access time period of a user equipment in accordance with another embodiment of the present invention.

Referring now to FIG. 7, a signal flow diagram 700 is provided that illustrates a method executed by communication system 100 in extending an access time period of a UE, such as UE 102, by approval of an owner/operator of a serving AP, such as AP 106, in accordance with an embodiment of the present invention. Signal flow diagram 700 begins when the UE, that is, UE 102, determines, by reference to timer 214, that an access time period during which the UE is permitted to camp on a cell associated with the serving AP 106 is about to, or has, expired and notifies 702 a user of the UE, via user interface 212, that the access time period is about to, or has, expired. For example, the UE may play a predetermined audio tone, or may display a textual message on a display screen of the user interface, that indicates that the access time period is about to, or has, expired.

In response to being notified that the access time period is about to, or has, expired, the user then instructs 704 the UE to request additional access time, that is, to request an additional period of time during which the UE may camp on the cell. For example, the user may input an instruction to UE 102, via user interface 212 of the UE, requesting the additional access time. For example, the user may input an audio instruction, may input a textual instruction via a display screen of the user interface, or may depress or touch a predetermined key or softkey of the user interface associated with such an instruction.

In response to receiving 704 the instruction to request additional access time, UE 102 conveys, to the serving AP 106, a message 706 requesting additional access time. Preferably, message 706 is a TAU Request that is modified by the present invention to indicate, in a Cause data field, that the cause for sending the message is to extend an access time. The TAU Request further includes the UE ID associated with UE 102 and may be further modified to include a CUG ID associated with AP 106 when the UE has stored the CUG ID in at least one memory device 204. In response to receiving the message requesting additional access time, AP 106 forwards 708 the message to MME 110. If the message requesting additional access time does not include the CUG ID associated with AP 106, the AP further includes the CUG ID in the forwarded additional access time request message.

In response to receiving the additional access time request message and based on the CUG ID included the message and the identifier of the owner/operator of AP 106 maintained in the at least one memory device 404 of the MME, MME 110 conveys a request 710 for additional access time to the owner/operator of AP 106, for example, UE 118. When the owner/operator of AP 106 is associated with a UE, such as a user associated with UE 118, MME determines an AP serving UE 118, such as AP 114, and conveys the request for additional access time to UE 118 via the serving AP, that is, AP 114, and corresponding air interface 116. MME includes in the request the UE ID associated with the requesting UE, that is, UE 102.

In response to receiving the additional access time request message from MME 110, UE 118 notifies 712 the user of UE 118 of the received request for additional access time. For example, UE 118 may display, on user interface 212 of UE 118, the additional access time request and an identifier associated with requesting UE 102, such as the received UE ID or a name or a phone number of the requestor if such a phone number is included in the message or if such a name or phone number is maintained in an address book of UE 118 in association with the received UE ID. In response to being notified of the request for additional access time, the user of UE 118 may grant or deny 714 the request. If the user denies the request, for example, by inputting an instruction denying the request to UE 102 via user interface 212 of the UE, or by not responding to the request, signal flow diagram 700 then ends.

Alternatively, the user of UE 118 may grant the request, for example, by inputting an instruction to UE 102, via user interface 212 of the UE, granting the request for additional access time. For example, the user may provide an audio instruction, may input a textual instruction via the display screen, or may touch a predetermined key or softkey of the user interface associated with such an instruction. In response to receiving a grant of the request from the user, UE 118 then conveys, to SMS-SC 112 via AP 114 and air interface 116, a first message 716 granting additional access time to UE 102. UE 118 further conveys, to MME 110 via AP 114 and air interface 116, a second message 722 granting additional access time to UE 102. The first and second messages 716, 722 granting additional access time each includes a data field identifying the message as a grant of additional access time and further includes a data field comprising the UE ID associated with UE 102.

In response to receiving the first additional access time grant message 716, SMS-SC 112 conveys an SMS message 718 to AP 106 that informs of the grant of additional access time and that includes the UE ID associated with UE 102. AP 106 then forwards 720 the received SMS message to UE 102 via air interface 104. In addition, in response to receiving the second additional access time grant message 722, MME 110 conveys a message 724, 726 comprising a grant of additional access time to UE 102 via AP 106 and air interface 104. Each additional access time grant message 724, 726 includes the UE ID associated with UE 102 and further identifies the additional access time period being granted to the UE. Preferably, each of messages 724 and 726 is a TAU Accept message that is modified in the present invention to include information concerning the granted additional access time.

In response to receiving additional access time grant message 726 from MME 110, UE 102 stores 728 a value associated with the additional access time period in at least one memory device 204. UE 102 further notifies 730 the user of UE 102 of the grant of additional access time period by displaying, on user interface 212, an indication of the additional access time period granted to the UE. In addition, in response to receiving additional access time grant message 726, UE 102 resets 732 timer 214 to count down the additional access time period, and signal flow diagram 700 then ends.

By providing a method and apparatus whereby a UE knows of a duration of an access time period, during which time period the UE is permitted to camp on a cell, and by further providing a capability for a UE to negotiate an extension of the access time period, communication system 100 provides flexible and ad hoc use of, and control over, small and in some cases individually owned and/or operated cells and associated access points, such as a Home Node B (HNB), a Home eNode B (HeNB), or a femtocell and their associated coverage areas. The owner/operator of an access point is able to regulate a time period during which the UE may camp on the associated cell and is able to control, on an ad hoc basis, who is permitted to camp on the cell. In turn, a user of a UE is able to request use of such a cell/access point, is able to know how much time has been granted, and remains available, for camping on that cell and is able to negotiate an extension of such time when desirable. Thus communication system 100 extends the cellular coverage and network access provided by the large cellular service providers by facilitating individual owner/operators ability to regulate camping on such cells/access points.

While the present invention has been particularly shown and described with reference to particular embodiments thereof, it will be understood by those skilled in the art that various changes may be made and equivalents substituted for elements thereof without departing from the scope of the invention as set forth in the IMS network below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the IMS network. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus.

What is claimed is:

1. A method for granting an access time period during which a user equipment may camp on a wireless network, the method comprising:
   receiving an access time request from the user equipment, wherein the access time request includes a user equipment identifier and requests the wireless network to inform the user equipment of the access time period previously associated with the user equipment identifier, during which the user equipment is allowed to camp on a cell associated with an access point;
   in response to receiving the request, determining, by reference to a group policy, the access time period during which the user equipment is allowed to camp on the cell associated with the access point; and
   conveying the access time period to the user equipment,
   wherein the access time period is conveyed to the user equipment via one of (1) an Attach Accept message that has been modified to identify the access time period, and (2) a Tracking Area Update Accept message that has been modified to identify the access time period, and
   wherein the group policy comprises a Closed User Group policy and wherein the access time period is a time period associated with the Closed User Group.

2. The method of claim 1, wherein determining the access time period during which the user equipment is allowed to camp on the cell associated with the access point comprises:
   in response to receiving the request, authenticating and authorizing the user equipment; and
   response to authenticating and authorizing the user equipment, determining, by reference to a group policy, an access time period during which the user equipment is allowed to camp on the cell associated the access point.

3. The method of claim 1, further comprising notifying a user, by the user equipment, of the access time period.

4. The method of claim 1, further comprising starting a timer, by the user equipment, to count down the access time period.

5. The method of claim 1, wherein the access time request comprises one of an Attach Request message and a Tracking Area Update Request message.

6. An apparatus capable of granting an access time period during which a user equipment is allowed to camp on a wireless network, the apparatus comprising:
   an at least one memory device that maintains a group policy associated with an access point; and
   a processor that is configured to receive an access time request from the user equipment when served by the access point, wherein the access time request includes a user equipment identifier and requests the wireless network to inform the user equipment of the access time period previously associated with the user equipment identifier, during which the user equipment is allowed to camp on a cell associated with the access point, in response to receiving the request, determine, by reference to the group policy, the access time period during which the user equipment is allowed to camp on the cell associated with the access point, and convey the access time period to the user equipment,
   wherein the access time period is conveyed to the user equipment via one of (1) an Attach Accept message that has been modified to identify the access time period, and (2) a Tracking Area Update Accept message that has been modified to identify the access time period, and
   wherein the group policy comprises a Closed User Group policy and wherein the access time period is a time period associated with the Closed User Group.

7. The apparatus of claim 6, wherein the access time request comprises one of an Attach Request message and a Tracking Area Update Request message.

8. A Mobility Management Entity comprising the apparatus of claim 6.

9. A system comprising the Mobility Management Entity of claim 8 and further comprising a network element in communication with the Mobility Management Entity and that is configured to receive a access time request from the user equipment, wherein the access time request requests the wireless network to inform the user equipment of the access time period during which the user equipment is allowed to camp on the cell associated with the access point, in response to receiving the request, authenticate and authorize the user equipment, and in response to authenticating and authorizing the user equipment, convey the access time period to the Mobility Management Entity, wherein the network element includes a group identifier associated with the group policy in the access time period conveyed to the Mobility Management Entity.

* * * * *